(12) United States Patent
Snowsill et al.

(10) Patent No.: US 11,156,118 B2
(45) Date of Patent: Oct. 26, 2021

(54) GAS TURBINE ENGINE

(71) Applicant: ROLLS-ROYCE plc, London (GB)

(72) Inventors: Guy D. Snowsill, Derby (GB); Robert J. Irving, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/934,052

(22) Filed: Jul. 21, 2020

(65) Prior Publication Data

US 2021/0054758 A1 Feb. 25, 2021

(30) Foreign Application Priority Data

Aug. 21, 2019 (GB) ..................... 1911980

(51) Int. Cl.
| | | |
|---|---|---|
| *F01D 11/08* | (2006.01) | |
| *F01D 11/00* | (2006.01) | |
| *F01D 17/00* | (2006.01) | |
| *F01D 25/16* | (2006.01) | |
| *F02C 7/06* | (2006.01) | |
| *F02C 7/36* | (2006.01) | |

(52) U.S. Cl.
CPC ............ *F01D 11/08* (2013.01); *F01D 11/003* (2013.01); *F01D 11/008* (2013.01); *F01D 17/00* (2013.01); *F01D 25/16* (2013.01); *F02C 7/06* (2013.01); *F02C 7/36* (2013.01); *F05D 2220/323* (2013.01); *F05D 2240/50* (2013.01); *F05D 2240/55* (2013.01); *F05D 2300/224* (2013.01)

(58) Field of Classification Search
CPC .... F01D 11/001; F01D 11/003; F01D 11/008; F01D 11/08; F01D 25/16; F02C 7/06; F02C 7/28; F02C 7/36; F05D 2220/323; F05D 2240/50; F05D 2240/55; F05D 2260/609; F05D 2300/224; Y02T 50/60
See application file for complete search history.

(56) References Cited

U.S. PATENT DOCUMENTS 4,561,246 A * 12/1985 Hovan .................. F01D 25/125
165/51
5,611,661 A * 3/1997 Jenkinson ............. F01D 25/183
184/6.11

(Continued)

FOREIGN PATENT DOCUMENTS

| EP | 1820944 A2 | 8/2007 |
|---|---|---|
| WO | 9423184 A1 | 10/1994 |

OTHER PUBLICATIONS

Great Britain search report dated Jan. 31, 2020, issued in GB Patent Application No. 1911980.9.

(Continued)

*Primary Examiner* — Igor Kershteyn (57) ABSTRACT

A gas turbine is provided for an aircraft comprising an engine core and a core flow path, a fan, a front drum cavity arranged radially inward of the core flow path, and a front bearing chamber. The front drum cavity comprises a front drum inlet, for providing air to the front drum cavity from the core air flow, located downstream of a stage of the compressor, and a front drum outlet, for ejecting air from the front drum cavity to the fan air flow, located axially between the fan and the compressor. The front drum inlet is through a seal, and the front drum outlet is through a spaced gap.

15 Claims, 5 Drawing Sheets

(56) References Cited

U.S. PATENT DOCUMENTS

| | | | | |
|---|---|---|---|---|
| 6,516,618 B1* | 2/2003 | Bock | ............ | F01D 25/16 |
| | | | | 60/39.08 |
| 7,296,398 B2* | 11/2007 | Moniz | ............ | F01D 1/26 |
| | | | | 60/226.1 |
| 7,836,675 B2* | 11/2010 | Corattiyil | ............ | F02C 7/06 |
| | | | | 60/39.08 |
| 2001/0047651 A1* | 12/2001 | Fukutani | ............ | F01D 11/04 |
| | | | | 60/785 |
| 2015/0016950 A1 | 1/2015 | Burghardt | | |
| 2015/0300187 A1* | 10/2015 | Suciu | ............ | F01D 5/02 |
| | | | | 415/1 |

OTHER PUBLICATIONS

European search report dated Dec. 15, 20020 issued in EP Patent application No. 20186861.

\* cited by examiner

GAS TURBINE ENGINE

CROSS-REFERENCE TO RELATED APPLICATIONS

This specification is based upon and claims the benefit of priority from United Kingdom patent application number GB 1911980.9 filed on Aug. 21, 2019, the entire contents of which is incorporated herein by reference.

BACKGROUND

Technical Field

The present disclosure relates to a gas turbine engine, a sealing arrangement of a gas turbine engine front drum cavity, and a method of designing and assembling a gas turbine engine.

Description of the Related Art

In a typical gas turbine engine the front drum cavity, radially inside the core flow path, is pressurised by air from an offtake at an axial position along the core. For example a typical location of the offtake is downstream of the low pressure compressor.

The front drum cavity may be adjacent or contain a front bearing housing. The front bearing housing is sealed against adjacent rotating components and typically is in fluid communication with the front drum cavity through the seals. The front bearing housing contains oil that is used to lubricate the front bearing, however if the pressure in the front bearing housing is higher than the pressure in the front drum cavity then oil can escape through the seals and into the front drum cavity.

Pressurising front drum cavity can prevent oil from leaking out of the front bearing housing. For example when the front drum cavity is at a higher pressure than the front bearing housing then air will leak into the front bearing housing from the front drum cavity and oil is prevented from leaking out of the front bearing housing.

Figure 1:
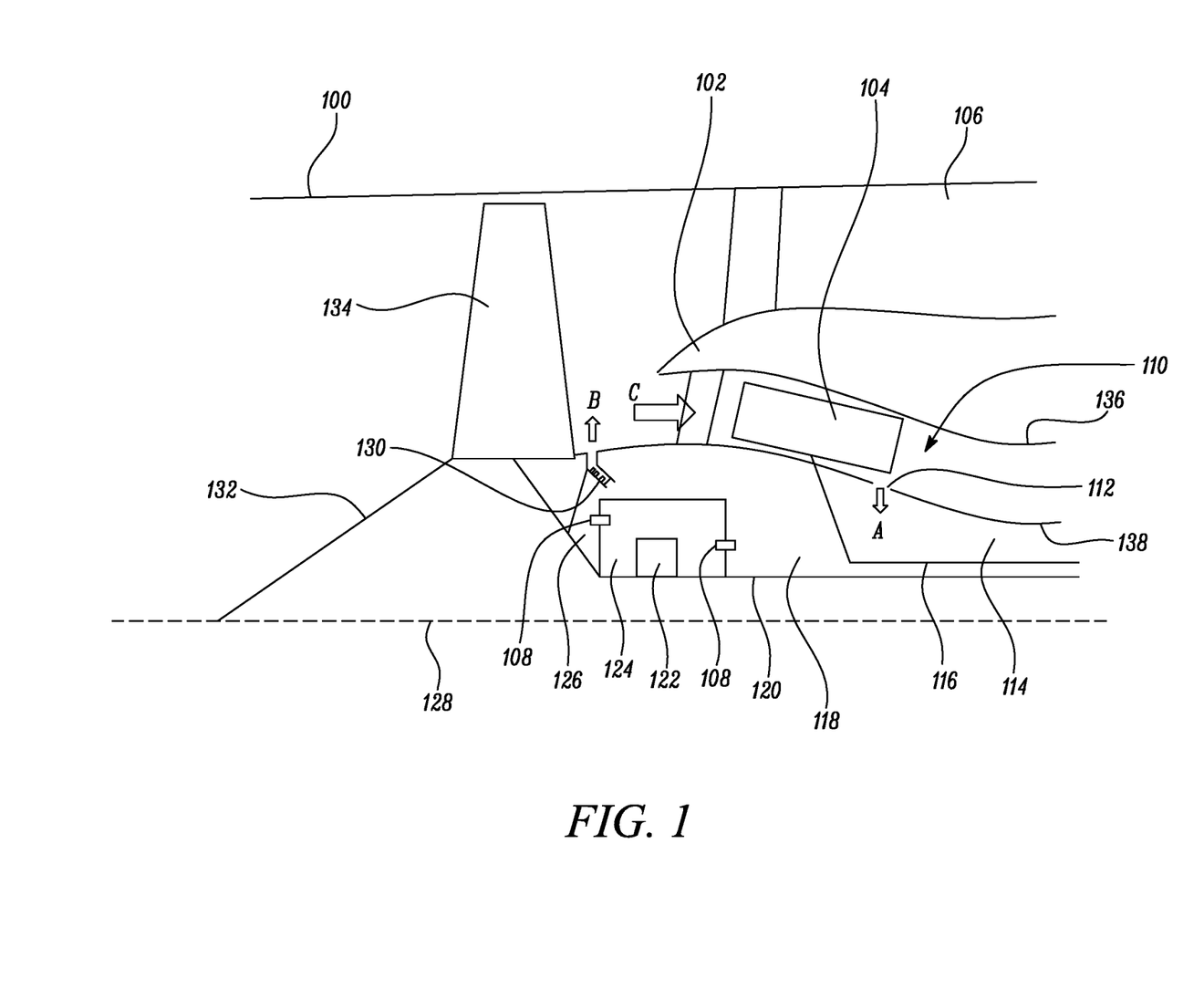
FIG. 1 is a sectional side view of an upstream portion of a prior art gas turbine engine.

A typical arrangement of the front end of a gas turbine engine, showing the sealing arrangement of the front drum cavity, is shown in FIG. 1.

FIG. 1 shows a fan 134, a core flow path 110 that receives a core flow C from the fan, and a compressor 104 that protrudes into the core flow path 110. The core flow path 110 has a radially outer surface 136 and a radially inner surface 138. The radially outer surface 136 and radially inner surface 138 have a gas washed side and define the boundary of the core flow path 110.

The fan 134 is driven by a fan shaft 120. The compressor 104 is driven by a compressor shaft 116. The fan 134 is surrounded by a nacelle 100 and upstream of the fan 134 is a nose cone 132. A core splitter 102 splits the air from the fan 134 into the a bypass duct 106 and the core flow path 110. A central rotational axis 128 is shown.

A front drum cavity comprises the regions 126, 118 and 114 in the FIG. 1 example. A front bearing housing 124 is shown bounded by the fan shaft 120 and the front drum cavity. The front bearing housing 124 contains a front bearing 122. The front bearing housing 124 is sealed against adjacent rotating components, for example by seals 108, and is in fluid communication with the front drum cavity through the seals 108.

A front drum cavity inlet 112 and a front drum cavity outlet 130 pressurise the front drum cavity. Air enters the front drum cavity through the flow A and exits the front drum cavity through the flow B. The front drum cavity inlet 112 is downstream of the compressor 104 and typically adjacent a stage of the compressor 104. The front drum cavity inlet 112 comprises circumferentially extending slots. The slots may be gaps in the radially inner surface 138. The front drum cavity outlet 130 comprises a labyrinth seal, and the flow B passes through the labyrinth seal.

Through the arrangement of FIG. 1 the front drum cavity is maintained at a high pressure, for example a pressure close to the pressure at the downstream end of the compressor 104. The high pressure ensures an overpressure is maintained in the front drum cavity with respect to the front bearing housing 124. The high pressure is achieved by the arrangement of the front drum cavity inlet 112 and front drum cavity outlet 130 as described above. For example the front drum cavity inlet 112 has a much lower flow resistance than the front drum cavity outlet 130. As a result the pressure in the front drum cavity is much closer to the pressure outside of the front drum cavity adjacent the front drum cavity inlet 112 than the pressure outside of the front drum cavity adjacent the front drum cavity outlet 130.

However the use of pressurised air from the compressor to pressurise the front drum cavity reduces the efficiency of the gas turbine engine. Further the pressure in the front drum cavity varies depending on the power of the engine. It is therefore desirable to have an improved arrangement for pressurising the front drum cavity.

SUMMARY

According to a first aspect there is provided a gas turbine engine for an aircraft comprising an engine core, the engine core comprising at least one turbine and at least one compressor, and a core flow path for channelling a core air flow through the engine core, a fan located upstream of the engine core, the fan comprising a plurality of fan blades for producing a fan air flow; a front drum cavity arranged radially inward of the core flow path; and a front bearing chamber, comprising a front bearing, arranged radially inward of the core flow path and in fluid communication with the front drum cavity through one or more chamber seals. The front drum cavity comprises a front drum inlet, for providing air to the front drum cavity from the core air flow, located downstream of a stage of the compressor. The front drum cavity comprises a front drum outlet, for ejecting air from the front drum cavity to the fan air flow, located axially between the fan and the compressor. The front drum inlet is through a seal, and the front drum outlet is through a spaced gap.

The front drum inlet may be located downstream of the compressor section. The compressor may be the low pressure compressor section. The low pressure compressor may have 3, 4 or 5 stages. The low pressure compressor may have 6 or 7 stages. The low pressure compressor may be the first compressor section downstream of the fan.

The fan air flow may be defined by an air flow downstream of the fan, for example that has passed through the fan. The fan air flow may comprise a core air flow and a bypass air flow. The fan air flow may split into a core air flow and a bypass air flow at an axial location downstream of the fan.

The core flow path may have a radially inner surface and a radially outer surface. The radially inner surface of the core flow path may extend forward of the radially outer surface of the core flow path. The radially inner surface of the core flow path may extend to the fan. The radially inner surface of the core flow path may extend forward of the core splitter.

The front drum inlet may be adjacent a compressor stage. The axial distance between the compressor stage and the front drum inlet may be less than the axial distance between compressor stages. The front drum inlet may provide pressurised air to (or fluid communication between) the front drum cavity from the core air flow.

The front drum outlet may be located forward of the first stage of the compressor, for example the low pressure compressor. The front drum outlet may be located axially forward of a core splitter. The front drum outlet may be located axially forward of a vane located at the upstream end of the core flow path. The front drum outlet may be axially closer to the fan than the compressor. The front drum outlet may be axially spaced from the fan by a distance less than 50%, 25% or 10% the axial length of a fan blade when installed in the gas turbine engine. The front drum outlet may be axially between (for example closer to) the fan and a core splitter or core splitter support structure. The front drum outlet may provide fluid communication between the front drum cavity and the downstream side of the fan.

The front drum inlet may be located on, or extend away from, the radially inner surface of the core flow path. The front drum outlet may be located on the radially inner surface of the core flow path.

A seal may comprise two parts that rotate with respect to one another, and between which there is contact or minimal separation, or a tortuous path, for minimising flow through the seal.

A spaced gap may comprise two parts that rotate with respect to one another but are spaced apart, for example with no contact between the two parts, such that the flow through the spaced gap is not minimised. The spaced gap may not comprise a tortuous path for airflow passing through it.

Advantageously, the flow through the front drum inlet from the core air flow may be minimised and therefore the efficiency of the engine is increased. Further, by reducing the flow through the front drum inlet, advantageously the pressure in the front drum cavity may vary less with different gas turbine engine powers or operating conditions. Surprisingly, by the front drum outlet not comprising a seal, flutter may be reduced in the fan. Flutter in the fan is a known problem in fan design. Flutter in the fan may be unwanted resonance or vibration that reduces fan efficiency.

The flow resistance across the front drum inlet may be higher than the flow resistance across the front drum outlet.

The flow resistance may be the flow rate through the inlet or outlet for a (set) delta pressure across the inlet or outlet. The flow resistance may be the pressure difference across the inlet or outlet for given boundary conditions or (set) flow rate through the inlet or outlet.

The gas turbine engine may further comprise a bearing chamber vent line in fluid communication with the front bearing chamber, wherein the bearing chamber vent line comprises a vent pump for lowering the pressure in the front bearing chamber.

An inlet to the bearing chamber vent line may be located at a position in the bearing chamber where oil does not pool. The vent line may be for venting an air oil mixture that has a greater proportion of air than oil.

The one or more chamber seals may be contact carbon seals and/or air riding carbon seals.

Advantageously, using an advanced seal, such as a contact carbon seal or an air riding seal, may mean that a scavenge line pump can maintain a constant low temperature within the front bearing chamber.

The front drum inlet may be a labyrinth seal. Alternatively the front drum inlet may be a foil seal or a contact carbon seal. The labyrinth seal may be stepped or plain.

The drum pressure ratio may be less than 0.6 during operation of the gas turbine engine.

Advantageously, a drum pressure ratio of less than 0.6 may provide an improved efficiency engine and/or less variation in drum pressure between different operating conditions or powers over the prior art. Operation of the engine may refer to or comprise cruise and/or maximum take-off conditions. For example the drum pressure ratio may be less than 0.6 at cruise and/or max take-off.

The drum pressure ratio may be less than 0.5, 0.4, 0.3 or 0.2 during operation of the gas turbine engine.

Advantageously, lowering the drum pressure ratio may improve the efficiency of the engine and/or provide less variation in drum pressure between different operating conditions or powers. For example a lower drum pressure ratio may reduce the offtake flow through the front drum inlet.

The drum pressure ratio may be less than 0.1 during operation of the gas turbine engine.

Advantageously, a drum pressure ratio of less than 0.1 may provide an optimal drum pressure ratio. A drum pressure ratio of less than 0.1 may minimise the contribution to flutter in the fan from the front drum cavity and/or minimise the efficiency loss to the engine from the front drum cavity and/or provide less variation in drum pressure between different operating conditions or powers. The drum pressure ratio may be less than 0.1 at cruise and/or max take-off.

The gas turbine engine may further comprises a scavenge line in fluid communication with the front bearing chamber. The scavenge line may be for removing an air oil mixture that is a greater proportion (for example predominantly) oil compared to air.

The scavenge line may comprise a scavenge pump. The scavenge pump may be a different pump to the vent line pump.

The gas turbine engine may further comprise a power gearbox. Optionally the gearbox may be located within the front bearing chamber.

The power gearbox may transmit power from a fan drive turbine to the fan. The power gearbox may be mechanically linked to a compressor section. Such a compressor section may be upstream or downstream of the power gearbox.

According to a second aspect there is provided a method of designing and assembling a gas turbine engine according to the first aspect, the method comprising the steps of defining the flow resistance of the front drum inlet and the front drum outlet such that the front drum cavity pressure is above the front bearing housing pressure; and installing the front drum inlet downstream of a compressor section and installing the front drum outlet axially between the fan and the compressor.

According to a third aspect there is provided a gas turbine engine for an aircraft comprising an engine core, the engine core comprising at least one turbine and at least one compressor, and a core flow path for channelling a core air flow through the engine core a fan located upstream of the engine core, the fan comprising a plurality of fan blades for producing a fan air flow; a front drum cavity arranged radially inward of the core flow path; and a front bearing chamber, comprising a front bearing, arranged radially inward of the core flow path and in fluid communication with the front drum cavity through one or more chamber seals. The front drum cavity comprises a front drum inlet, for providing air to the front drum cavity from the core air flow, located downstream of a stage of the compressor, and a front drum outlet, for ejecting air from the front drum cavity to the fan air flow, located axially between the fan and the compressor. The drum pressure ratio is less than 0.6 during operation of the gas turbine engine.

The drum pressure ratio may be less than 0.5, 0.4, 0.3 or 0.2 during operation of the gas turbine engine. The drum pressure ratio may be less than 0.1 during operation of the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^{-2}$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 2:
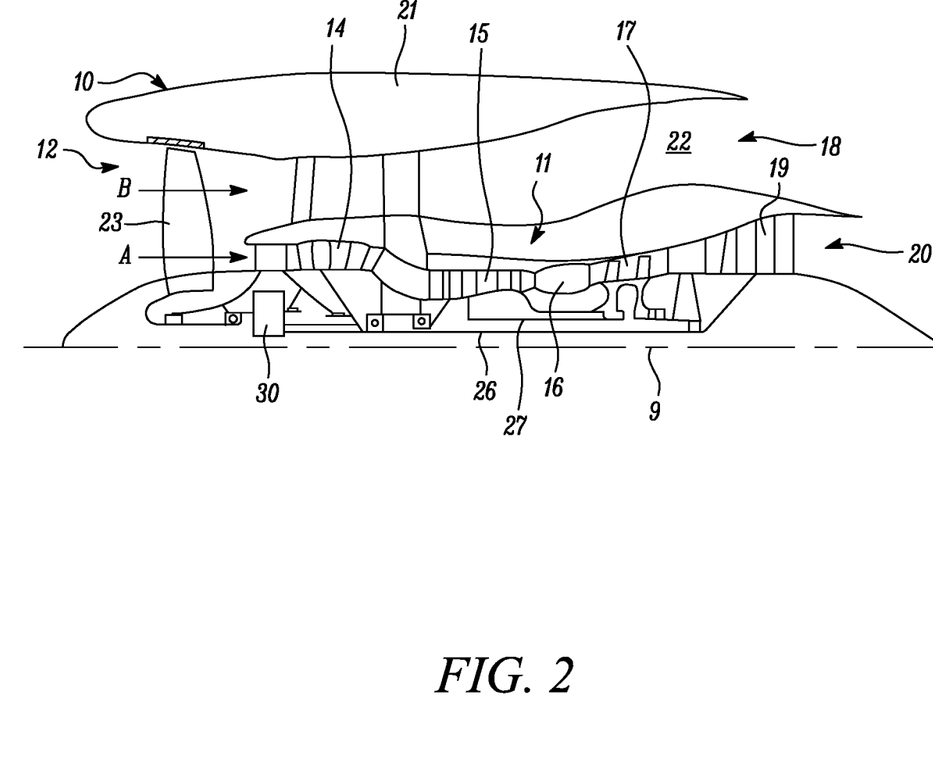
FIG. 2 is a sectional side view of a gas turbine engine.

FIG. 2 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 3:
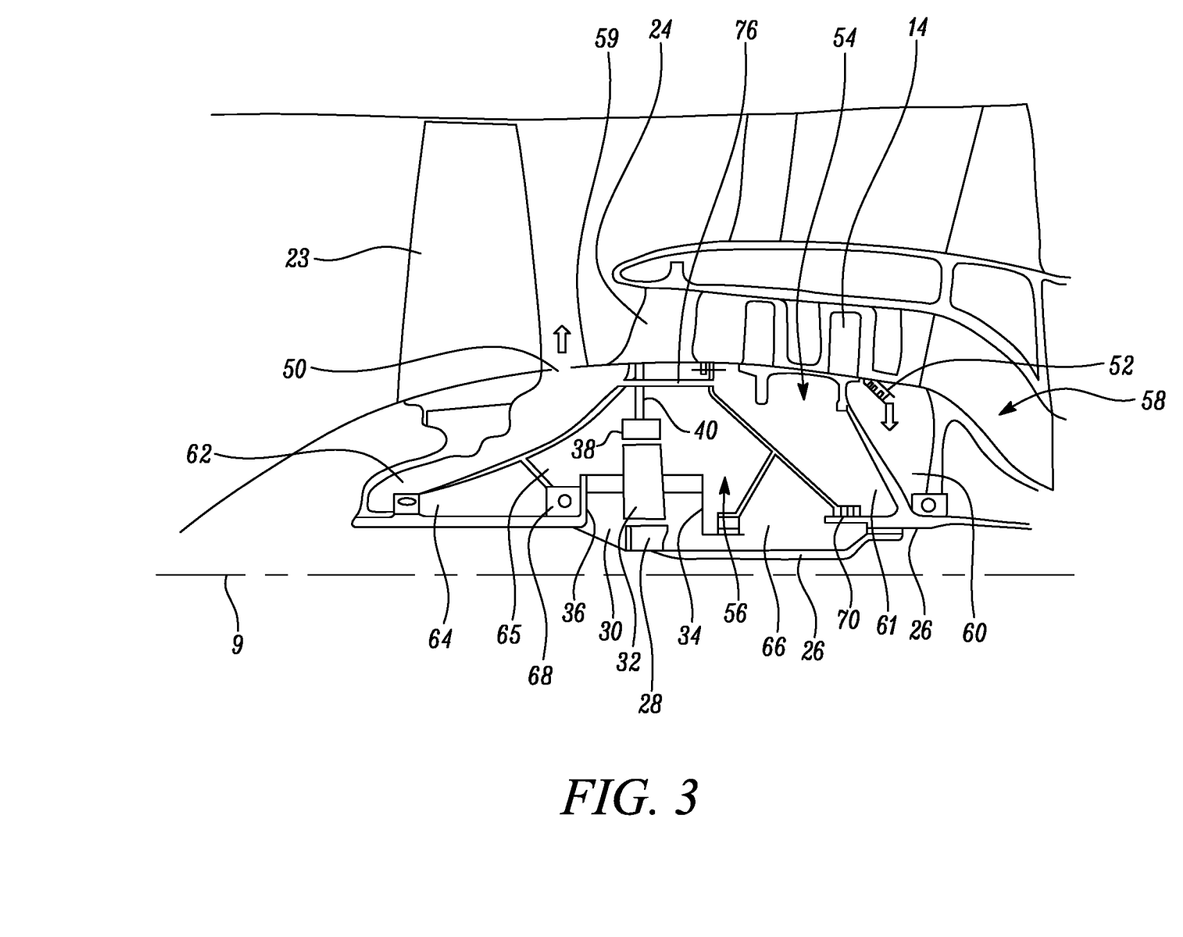
FIG. 3 is a close up sectional side view of an upstream portion of a gas turbine engine.

FIG. 3 shows an upstream portion of a geared gas turbine engine, for example the gas turbine engine 10. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

FIG. 3 shows a front drum cavity 54 comprising first chamber 60, second chamber 61 and third chamber 62. The first chamber 60, second chamber 61 and third chamber 62 are all linked to form a single cavity. The second chamber 61 and third chamber 64 are linked by drum passageway 76. The front drum cavity 54 may be at the same pressure across the cavity. The front drum cavity 54 may be at substantially the same pressure across the cavity, for example within +/−1 psi or +/−0.5 psi or +/−0.1 psi.

FIG. 3 shows a front bearing chamber 56 comprising fourth chamber 64, fifth chamber 65 and sixth chamber 66. The fourth chamber 64, fifth chamber 65 and sixth chamber 66 are all linked to form a single cavity. The front bearing chamber 56 comprises a front bearing 68. The front bearing chamber 56 may be at the same pressure across the cavity. The front bearing chamber 56 may be at substantially the same pressure across the cavity, for example within +/−1 psi or +/−0.5 psi or +/−0.1 psi.

In the FIG. 3 example the front bearing chamber comprises a power gearbox, however in other examples a power gearbox may not be present. For example the arrangement of the front drum cavity, for example the arrangement and/or flow resistances of the front drum inlet and outlet may be applied to other gas turbine arrangements, for example non-geared gas turbine engines.

In the FIG. 3 example the front bearing chamber 56 is bounded by the shaft 26, linkages 36 (and seals between the shaft 26 and linkages 36), the second chamber 61 and third chamber 62 and a radially inner surface 59 of a core flow path 58. In other examples the front bearing chamber 56 may be bounded only by a shaft and the front drum cavity. In the FIG. 3 example chamber seals, for example chamber seal 70, are positioned between the front bearing chamber 56 and the front drum cavity 54. As shown in FIG. 3, the front drum cavity 54 is typically bounded by the radially inner surface 59, a structure of the fan 23, the shafts 26, 36, the front bearing housing 56 and a structure of a compressor section (for example the low pressure compressor or the high pressure compressor).

FIG. 3 shows a front drum inlet 52 and a front drum outlet 50. In the FIG. 3 example the front drum inlet 52 is a labyrinth seal. In the FIG. 3 example the front drum outlet 50 is a spaced gap.

The spaced gap is a gap between the radially inner surface 59 of the core flow path 58 and a gas washed surface that projects from the base of a fan blade 23. These two parts rotate with respect to each other. A spaced gap may comprise no features projecting off the parts that are spaced apart, for example fins. A spaced gap may resemble a labyrinth seal without the fins. In the FIG. 3 example the spaced gap is positioned at the gas washed surface, however in other examples the spaced gap may be recessed from the surface, for example within third chamber 62. In such arrangement there may be a gap at the gas washed surface greater than the separation at the spaced gap within the third chamber 62, and a structure between the gap at the gas washed surface and spaced gap within the third chamber 62.

In the FIG. 3 example the front drum outlet 50 is adjacent the fan 23. For example the front drum outlet 50 is axially closer to the fan 23 than it is to the compressor 14 or the core splitter supporting structure 24.

In the FIG. 3 example the front drum cavity 54 may be maintained at a pressure above the front bearing chamber 56 by, for example, a vent line comprising a vent line pump. A vent line pump (not shown) may be in fluid communication with the front bearing chamber 56 and reduces the pressure in the front bearing chamber 56, for example to below atmospheric pressure. Alternatively a scavenge pump, and advanced seals (for example chamber seal 70) between the front drum cavity 54 and the front bearing chamber 56, may maintain the overpressure (in addition to or instead of the vent line). Advanced seals may be, for example, contact carbon seals or air riding carbon seals.

Indicative pressures in the arrangement of FIG. 3 are shown in table 1 below. Pin is the pressure at the entrance of the front drum inlet 52. Pdrum is the pressure in the front drum cavity 54. Pout is the pressure at the exit of the front drum outlet 50.

The drum pressure ratio is defined by the following equation:

TABLE 1 indicative pressures for the FIG. 3 arrangement.

$$\text{Drum pressure ratio} = \frac{Pdrum - Pout}{Pin - Pout}$$

|  | Cruise (psi) | Max-take off (psi) |
| --- | --- | --- |
| Pin | 20 | 60 |
| Pdrum | 6 | 18 |
| Pout | 5 | 15 |
| Drum pressure ratio | 0.07 | 0.07 |

Indicative pressures for a prior art arrangement, for example the arrangement of FIG. 1, are shown below in table 2 for comparison.

TABLE 2 indicative pressures for a prior art arrangement.

|  | Cruise (psi) | Max-take off (psi) |
| --- | --- | --- |
| Pin | 20 | 60 |
| Pdrum | 15.5 | 45 |
| Pout | 5 | 15 |
| Drum pressure ratio | 0.70 | 0.67 |

It can be seen from tables 1 and 2 that the drum pressure ratio is reduced substantially compared to the prior art arrangement.

The pressure loss across the front drum inlet 52 may be between 9 and 10 psi, or 9 and 14 psi at cruise condition. The pressure loss across the front drum inlet 52 may be between 28 and 30 psi, or 28 and 45 psi at mid take-off condition.

The pressure loss across the front drum outlet 50 may be between 0.6 and 0.8, or 0.6 and 1.1 psi at cruise condition. The pressure loss across the front drum outlet 50 may be between 1.5 and 1.8, or 1.5 and 3.1 psi at mid take-off condition.

Therefore the flow resistance of the front drum inlet 52 may be approximately 10 times the flow resistance of the front drum outlet 50.

Figure 4:
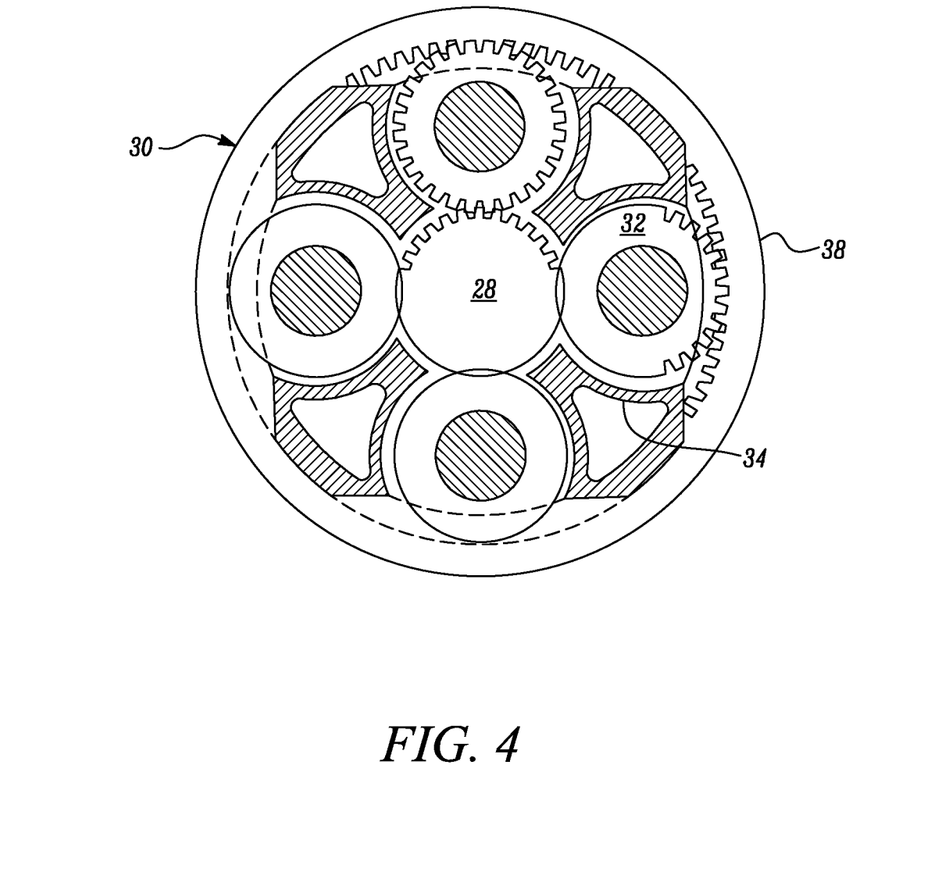
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 3 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 2), and a circumferential direction (perpendicular to the page in the FIG. 2 view). The axial, radial and circumferential directions are mutually perpendicular.

Figure 5A:
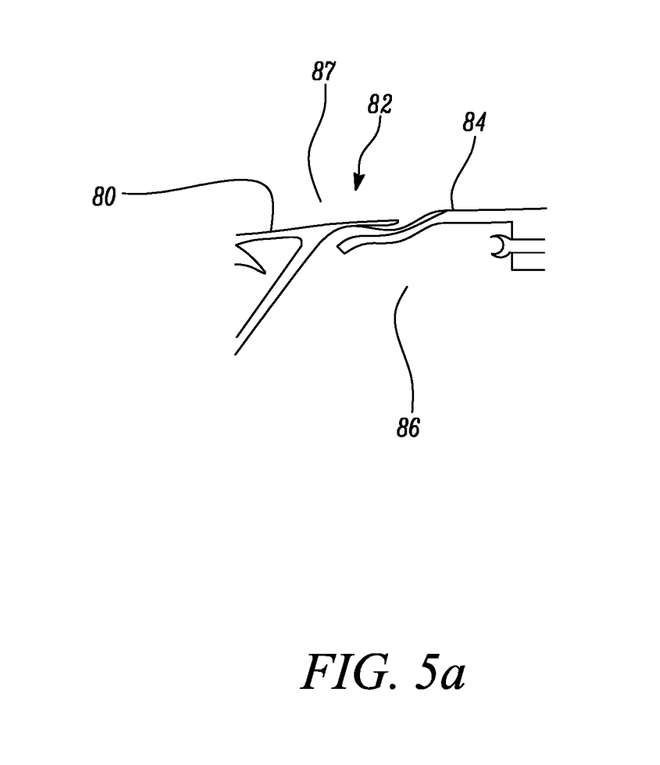
FIG. 5a is a close up section side view of a front drum outlet.

FIG. 5a shows a close up sectional side view of a front drum outlet 82, which may be an example of the front drum outlet 50 of FIG. 3. FIG. 5a shows a fan projection 80 and a core projection 84. The fan projection 80 may be fixed to and rotate with the fan, for example the fan 23 of FIG. 3. The core projection 84 may not rotate and extend from the radially inner gas washed surface of the core flow path, for example the radially inner surface 59 of FIG. 3. The core projection 84 and fan projection 80 provide a spaced gap between a front drum cavity 86 and the gas flowpath 87.

The fan projection 80 and core projection 84 overlap one another in the FIG. 5a example. The core projection 84 extends radially inward, or underneath, the fan projection 80. The core projection 84 and fan projection 80 extend parallel to one another over an axial length, for example a short axial length. A spaced gap is provided between the core projection 84 and the fan projection 80. The spaced gap is provided between opposing surfaces of the core projection 84 and the fan projection 80. The opposing surfaces have no flow restriction features, for example such as fins. The front drum outlet 82 does not provide a tortuous path to airflow passing through it. In the FIG. 5a example the spaced gap is a radial gap. However in other examples the core projection 84 and fan projection 80 may be at a different orientation, or located within the front drum cavity 86. In other examples the fan projection 80 and core projection 84 may not overlap. In other examples the front drum outlet 82 spaced gap may be a slot or hole.

Figure 5B:
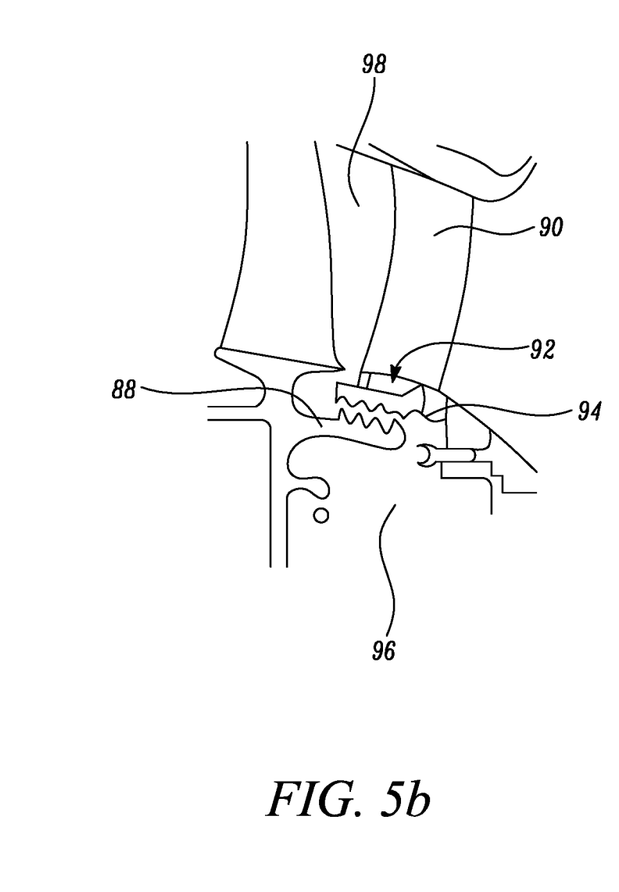
FIG. 5b is a close up section side view of a front drum inlet.

FIG. 5b shows a close up sectional side view of a front drum inlet 92, which may be an example of the front drum inlet 52 of FIG. 3. FIG. 5b shows a compressor section projection 88 and a core seal projection 94 that together form a labyrinth seal.

The compressor section projection 88 extends from the compressor disc. The compressor disc may form part of, for example, the compressor 14 of FIG. 3. The core seal projection 94 extends from the radially inner surface of a core flow path, which may for example be the radially inner surface 59 shown in FIG. 3. A compressor support structure 90 is adjacent the front drum inlet 92. The support structure 90 may provide an improved seal, for example reducing the influence of vibration. The front drum inlet 92 provides a flow restriction between the core flow path 98 and a front drum cavity 96, which may be an example of the front drum cavity 54 of FIG. 3.

In other examples the front drum inlet 92 may be a stepped labyrinth seal, a foil seal or a contact carbon seal. These seals may provide an equivalent flow restriction compared to the labyrinth seal shown in FIG. 5b.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, the gas turbine engine comprising:
    an engine core comprising at least one turbine and at least one compressor, and a core flow path for channelling a core air flow through the engine core;
    a fan located upstream of the engine core, the fan comprising a plurality of fan blades for producing a fan air flow; and
    a front drum cavity arranged radially inward of the core flow path;
    a front bearing chamber, comprising a front bearing, arranged radially inward of the core flow path and in fluid communication with the front drum cavity through one or more chamber seals; wherein
    the front drum cavity comprises a front drum inlet, for providing air to the front drum cavity from the core air flow, located downstream of a stage of the compressor, and a front drum outlet, for ejecting air from the front drum cavity to the fan air flow, located axially between the fan and the compressor; and
    wherein the front drum inlet is through a seal, and the front drum outlet is through a spaced gap.

2. The gas turbine of claim 1, wherein the flow resistance across the front drum inlet is higher than the flow resistance across the front drum outlet.

3. The gas turbine engine of claim 1, further comprising a bearing chamber vent line in fluid communication with the front bearing chamber, wherein the bearing chamber vent line comprises a vent pump for lowering the pressure in the front bearing chamber.

4. The gas turbine engine of claim 1, wherein the one or more chamber seals are contact carbon seals and/or air riding carbon seals.

5. The gas turbine engine of claim 1, wherein the front drum inlet is a labyrinth seal.

6. The gas turbine of claim 1, wherein the drum pressure ratio is less than 0.6 during operation of the gas turbine engine.

7. The gas turbine of claim 1, wherein the drum pressure ratio is less than 0.5 during operation of the gas turbine engine.

8. The gas turbine of claim 1, wherein the drum pressure ratio is less than 0.1 during operation of the gas turbine engine.

9. The gas turbine engine of claim 1, wherein the gas turbine engine further comprises a scavenge line in fluid communication with the front bearing chamber.

10. The gas turbine engine of claim 9, wherein the scavenge line comprises a scavenge pump.

11. The gas turbine engine of claim 1, further comprising a power gearbox, wherein optionally the gearbox is located within the front bearing chamber.

12. A method of designing and assembling a gas turbine engine of claim 1, the method comprising the steps of:
    defining the flow resistance of the front drum inlet and the front drum outlet such that the front drum cavity pressure is above the front bearing housing pressure; and
    installing the front drum inlet downstream of a compressor section and installing the front drum outlet axially between the fan and the compressor.

13. A gas turbine engine for an aircraft, the gas turbine engine comprising:
    an engine core comprising at least one turbine and at least one compressor, and a core flow path for channelling a core air flow through the engine core;
    a fan located upstream of the engine core, the fan comprising a plurality of fan blades for producing a fan air flow; and
    a front drum cavity arranged radially inward of the core flow path;

a front bearing chamber, comprising a front bearing, arranged radially inward of the core flow path and in fluid communication with the front drum cavity through one or more chamber seals; wherein the front drum cavity comprises a front drum inlet, for providing air to the front drum cavity from the core air flow, located downstream of a stage of the compressor, and a front drum outlet, for ejecting air from the front drum cavity to the fan air flow, located axially between the fan and the compressor; and wherein the drum pressure ratio is less than 0.6 during operation of the gas turbine engine.

14. The gas turbine of claim 13, wherein the drum pressure ratio is less than 0.5 during operation of the gas turbine engine.

15. The gas turbine of claim 13, wherein the drum pressure ratio is less than 0.1 during operation of the gas turbine engine.

\* \* \* \* \*